(12) United States Patent
Lee

(10) Patent No.: US 7,705,486 B2
(45) Date of Patent: Apr. 27, 2010

(54) INTEGRATED CIRCUIT HAVING MULTIPLE POWER DOMAINS

(75) Inventor: Hoi-Jin Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 11/707,500

(22) Filed: Feb. 16, 2007

(65) Prior Publication Data

US 2007/0234083 A1    Oct. 4, 2007

(30) Foreign Application Priority Data

Feb. 28, 2006    (KR) .................. 2006-19485

(51) Int. Cl.
*H02J 1/10* (2006.01)
(52) U.S. Cl. ..................................... 307/43
(58) Field of Classification Search ............. 307/43
See application file for complete search history.

(56) References Cited

U.S. PATENT DOCUMENTS

| | | | |
|---|---|---|---|
| 5,945,817 A * | 8/1999 | Nguyen | ............... 323/273 |
| 6,650,589 B2 | 11/2003 | Clark | ............... 365/226 |
| 7,180,208 B2 * | 2/2007 | Chen et al. | ............... 307/116 |
| 7,282,905 B2 * | 10/2007 | Chen et al. | ............... 324/158.1 |
| 2006/0184808 A1 * | 8/2006 | Chua-Eoan et al. | ......... 713/300 |
| 2008/0067995 A1 * | 3/2008 | Chua-Eoan et al. | ......... 323/284 |
| 2008/0074171 A1 * | 3/2008 | Bhattacharya et al. | ...... 327/538 |

OTHER PUBLICATIONS

Korean Patent Application No. 1019990060930 to Oh, having Publication date of Jul. 4, 2001 (w/ English Abstract page).
Korean Patent Application No. 1020030061089 to Choi, having Publication date of Mar. 10, 2005 (w/ English Abstract page).
Japanese Patent Application No. 2003-357324 to Toshiharu et al., having Publication date of May 12, 2005 (w/ English Abstract page).

* cited by examiner

*Primary Examiner*—Jared J Fureman
*Assistant Examiner*—Michael Rutland Wallis
(74) *Attorney, Agent, or Firm*—Monica H. Choi

(57) ABSTRACT

An integrated circuit includes first and second power domains, a power supply control unit, and a switch block. The power supply control unit supplies a first voltage to the first power domain and a second voltage to the second power domain. The switch block provides at least one current path between the first and second power domains during a predetermined operating mode such as by connecting a first power line of the first power domain to a second power line of the second power domain.

15 Claims, 3 Drawing Sheets

INTEGRATED CIRCUIT HAVING MULTIPLE POWER DOMAINS

BACKGROUND OF THE INVENTION

This application claims priority under 35 USC §119 to Korean Patent Application No. 2006-19485, filed on Feb. 28, 2006 in the Korean Intellectual Property Office, the disclosure of which is incorporated herein in its entirety by reference.

1. Field Of The Invention

The present invention relates generally to integrated circuits, and more particularly, to an integrated circuit having multiple power domains with power lines that are connected together in a predetermined operating mode.

2. Background Of The Invention

A semiconductor integrated circuit fabricated as a conventional flash memory has generally used a power voltage of 5 Volts as an operating voltage. However, lower operating voltages are desired with higher integration and scaling-down of semiconductor integration circuits. For example, an operating voltage of about 1.0 V is used for a memory device, and an operating voltage of from about 0.6 Volts to about 1.3 Volts is used for a logic circuit such as a central processing unit (CPU) depending on an operating mode thereof.

When the operating voltage decreases, a noise margin of the semiconductor integrated circuit is reduced, and an allowable IR (current-resistance) voltage drop is reduced. Also, for higher integration, not only signal lines but also power lines of the integrated circuit become longer and thinner. Thus, the resistance of the power line increases that in turn significantly increases the IR voltage drop. Consequently, an operating frequency of the highly integrated circuit is lowered by the increased IR voltage drop.

In addition, more complicated integrated circuits are fabricated with more gates for high performance. Since power consumption increases with higher number of gates, technology for reducing power consumption is desired. To address such issues, multi-power domain technology is used for separating power domains among different functional blocks with control of turning on/off the power supplied to the multiple power domains depending on operating modes of the functional blocks.

FIG. 1 is a block diagram of a semiconductor integrated circuit 10 according to the conventional art. Referring to FIG. 1, the integrated circuit 10 includes a regulator 11 for generating internal operating voltages and two power domains 13 and 15. Each of the power domains 13 and 15 independently receives a respective voltage from the regulator 11.

That is, the power domain 13 receives a first operating voltage V from the regulator 11, and the power domain 11 receives a second operating voltage V' from the regulator 11. The first and second operating voltages V and V' may each be set to a same voltage level or to different voltage levels, as disclosed in U.S. Pat. No. 6,650,589.

However, power lines of the power domains 13 and 15 in the prior art remain separated (i.e., disconnected) from eachother. Thus in the prior art, the IR voltage drops in the separated power domains 13 and 15 may be higher and more difficult to control than when the integrated circuit has one power domain. For example, the IR voltage drop within one of the power domains 13 and 15 may become high enough for significantly degrading the operating frequency of the integrated circuit. Nevertheless, multiple power domains for an integrated circuit are desired for minimizing power consumption.

SUMMARY OF THE INVENTION

Accordingly, an integrated circuit according to the present invention is implemented with multiple power domains with a mechanism for separating and coupling the multiple power domains depending on the operating mode of the integrated circuit.

An integrated circuit according to one aspect of the present invention includes first and second power domains, a power supply control unit, and a switch block. The power supply control unit supplies a first voltage to the first power domain and a second voltage to the second power domain. The switch block provides at least one current path between the first and second power domains during a predetermined operating mode.

For example, the switch block diverts current to the second power domain from the first power domain for increasing the total current in the second power domain during the predetermined operating mode.

In another embodiment of the present invention, the integrated circuit further includes a first power line having the first voltage applied thereon within the first power domain, and a second power line having the second voltage applied thereon within the second power domain. In that case, the switch block connects the first power line to the second power line during the predetermined operating mode. In an example embodiment of the present invention, the first and second voltages are set to a same voltage level during the predetermined operating mode.

In a further embodiment of the present invention, the switch block disconnects the first power line from the second power line when the integrated circuit is not in the predetermined operating mode. In an example embodiment of the present invention, the first and second voltages are set to different voltage levels when the integrated circuit is not in the predetermined operating mode.

In another example embodiment of the present invention, the switch block includes a plurality of transistors, with each transistor being turned on for providing a respective current path between the first and second power domains during the predetermined operating mode.

In a further embodiment of the present invention, the integrated circuit further includes a third power domain and another switch block. In that case, the power supply control unit supplies a third voltage to the third power domain, and the other switch block provides at least one current path between the third and second power domains during the predetermined operating mode. For example, the switch block connects the third power line to the second power line during the predetermined operating mode. The first, second, and third voltages are set to a same voltage level during the predetermined operating mode.

In another aspect of the present invention, the first power line is formed as a first power mesh within the first power domain, and the second power line is formed as a second power mesh within the second power domain. In that case, the switch block includes a plurality of transistors that are turned on for connecting the first power line to the second power line during the predetermined operating mode.

In this manner, the first and second power domains are separated for minimizing power consumption when the integrated circuit does not operate in the predetermined operating mode. However, the first and second power domains are connected for more flexible control of current flow therein during the predetermined operating mode when high frequency operation is more critical.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, and 4 refer to elements having similar structure and/or function.

DETAILED DESCRIPTION OF THE INVENTION

Figure 1:
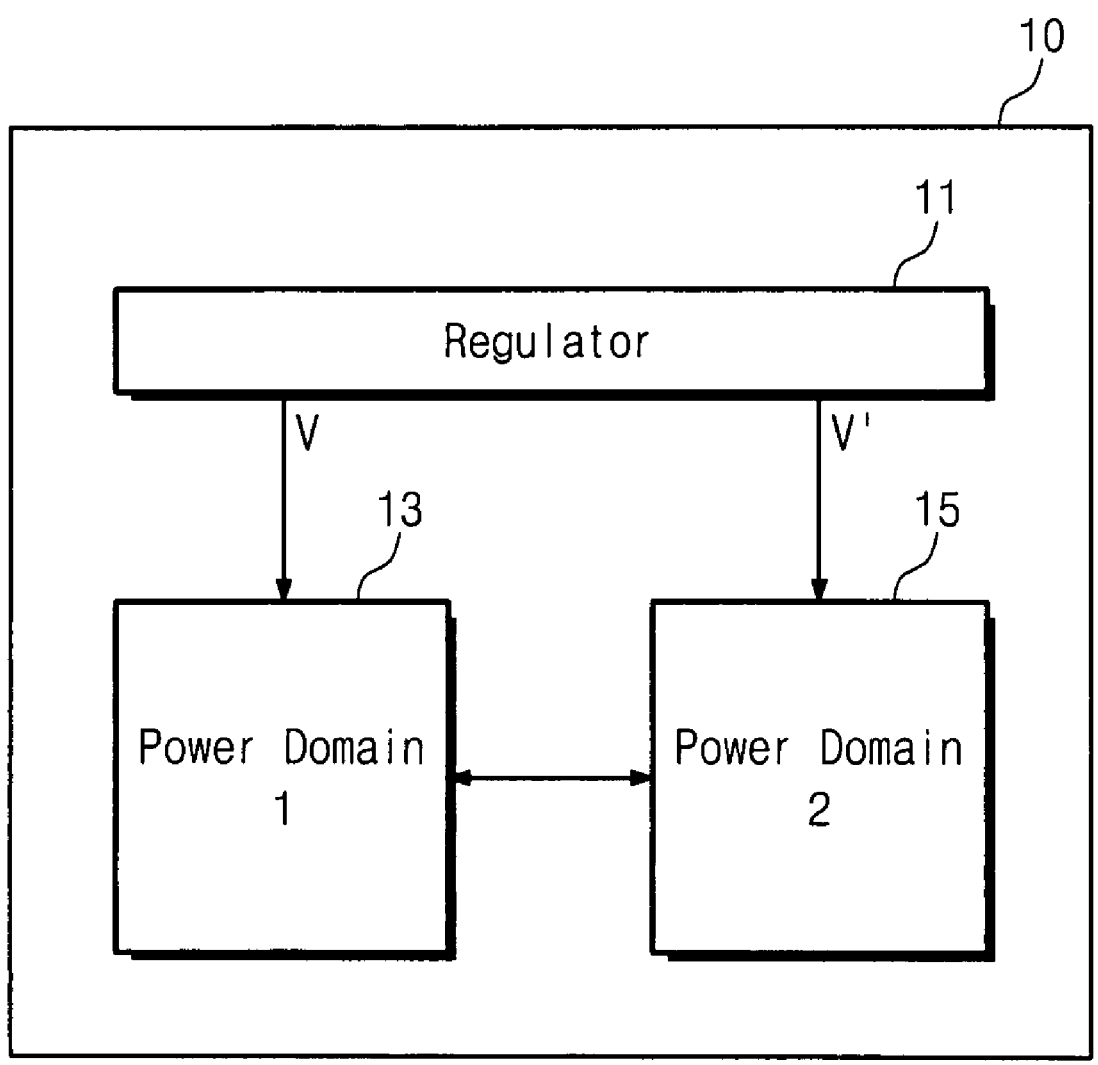
FIG. 1 is a block diagram of a semiconductor integrated circuit with multiple power domains according to the conventional art.
Figure 2:
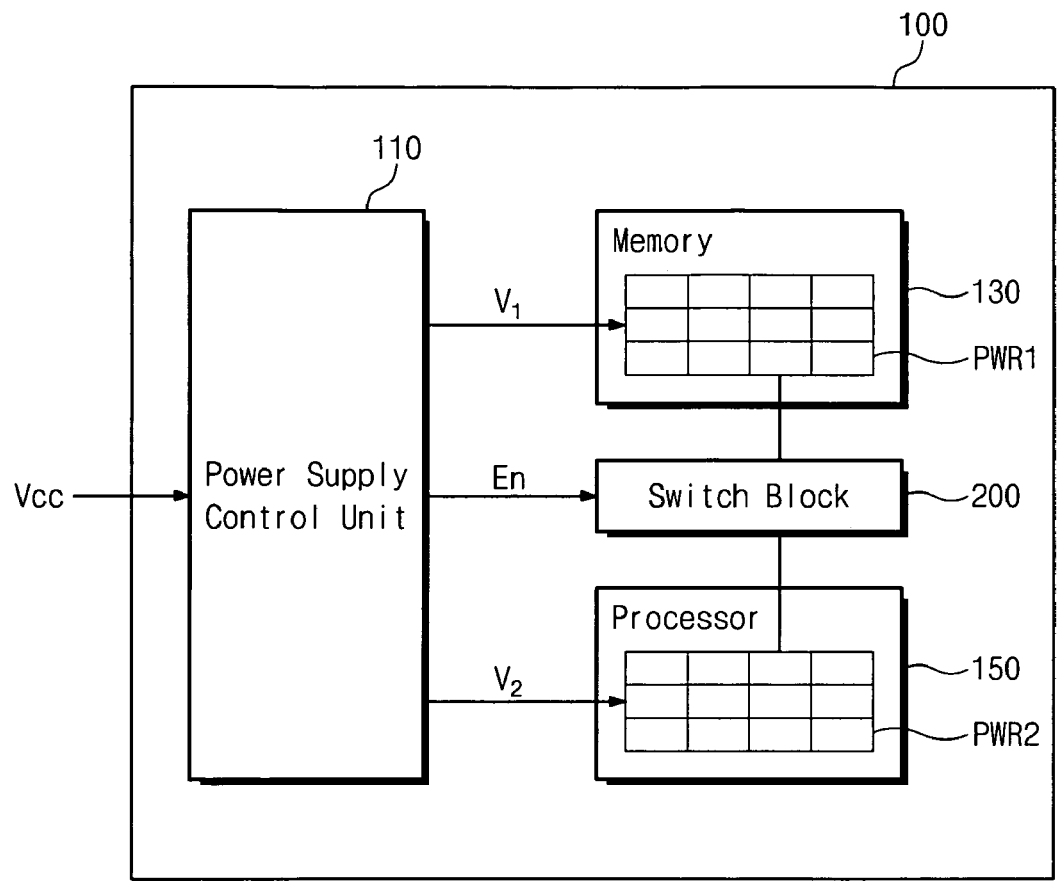
FIG. 2 is a block diagram of a semiconductor integrated circuit with multiple power domains, according to an embodiment of the present invention.

FIG. 2 is a block diagram of a semiconductor integrated circuit 100 according to an embodiment of the present invention. Referring to FIG. 2, the integrated circuit 100 includes a power supply control unit 110, a memory unit 130, a processor 150, and a switch block 200. The memory unit 130 and the processor 150 are implemented as separate power domains that are physically separated. That is, the power domains 130 and 150 have separate physical power supply lines for receiving respective operating voltages applied thereon.

Referring to FIG. 2, the power supply control unit 110 provides respective operating voltages V1 and V2 to the multiple power domains 130 and 150. The power supply control unit 110 may be fabricated as part of the integrated circuit 100 or may be formed outside the integrated circuit 100. If formed outside the integrated circuit 100, the integrated circuit 100 has separate pins receiving the operating voltages V1 and V2 from the external power supply control unit 110.

The power supply control unit 110 that is formed as part of the integrated circuit 100 uses an externally provided power voltage Vcc to generate internal power (i.e., operating) voltages V1 and V2 to the memory unit 130 and the processor 150, respectively. The power supply control unit 110 supplies a first operating voltage V1 to the first power domain 130 and supplies a second operating voltage V2 to the second power domain 150.

The memory unit 130 as the first power domain includes a first power line PWR1 implemented as a first power mesh having a network structure of meshes according to an example embodiment of the present invention. The processor 130 as the second power domain includes a second power line PWR2 implemented as a second power mesh having a network structure of meshes according to an example embodiment of the present invention.

The first operating voltage V1 is applied on the first power line PWR1 of the first power domain 130, and the second operating voltage V2 is applied on the second power line PWR2 of the second power domain 150. The operating voltages V1 and V2 are set to the same voltage level or are set to different voltage levels depending on the operating mode of the integrated circuit 100. For example, the operating voltage V2 supplied to the processor 150 is about 0.7 V (Volt) or less, while the operating voltage V1 supplied to the memory unit 130 is in a range of from about 1.0 V to about 1.3 V, during a power save mode of the integrated circuit 100.

Alternatively, the first and second operating voltages V1 and V2 during a normal operating mode of the integrated circuit 100 are set to a same voltage level of 1.0 V. In addition during a power sleep mode of the integrate circuit 100, the second operating voltage V2 supplied to the processor 150 is turned off for reducing power consumption, and the first operating voltage V1 supplied to the memory unit 130 is set to about 1.0 V for minimizing wake-up time of the integrated circuit 100.

The memory unit 130 and the processor 150 are formed as separate power domains for separate control of the operating voltages V1 and V2 such that operating stability of the memory device 130 is maintained while simultaneously reducing power consumption of the processor 150.

For example, if the memory device 130 and the processor 150 were formed as one power domain receiving one operating voltage via one power line, such an operating voltage is limited by the memory device 130. That is, the memory device 130 cannot operate properly under a predetermined voltage (e.g., about 1.0 V). However, logic circuits inside the processor 150 generally operate well even at a low voltage (about 0.7 V). Thus, the operating voltage to the processor 150 is lowered to such a low voltage level during a power save mode when the integrated circuit 100 does not need to operate at a maximum operating frequency.

However, if the memory device 130 and the processor 150 were to receive just one operating voltage, the higher operating voltage (of about 1.0 V) is also applied on the processor 150 increasing power consumption even during the power save mode. Thus, the memory 130 and the processor 150 are formed as separate power domains having separate power lines such that respective operating voltage V1 and V2 thereto may be independently controlled depending on the operating mode of the integrated circuit 100.

In that case, the power supply control unit 110 regulates an external power voltage Vcc to generate the first and second operating voltages V1 and V2 set to a same voltage level in a range of from about 1.0 V to about 1.3 V during the normal operating mode when the operating frequency of the processor 150 is more critical. On the other hand, the power supply control unit 110 sets the first operating voltage V1 supplied to the memory 130 at about 1.0 V, but sets the second operating voltage V2 supplied to the processor 150 to a lower voltage of about 0.7 V during a power save mode where the operating frequency of the integrated circuit 100 is not as critical. Thus, power consumption of the integrated circuit 100 may be minimized during the power save mode.

However, when the first and second operating voltages are set to the same voltage levels during the normal operating mode, IR (current resistance) voltage drops within the processor 150 may be problematic because the processor 150 consumes much current during the normal operating mode. The memory unit 130 consumes less current than the processor 150 during the normal operating mode.

Figure 3:
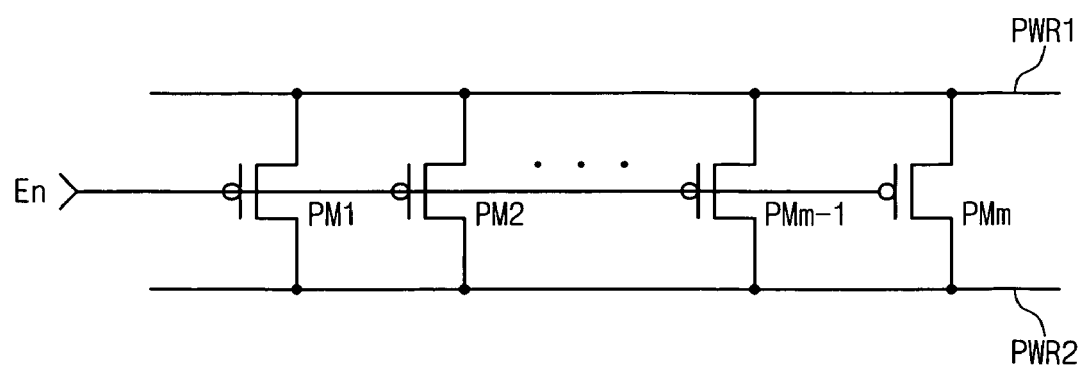
FIG. 3 is a circuit diagram of a switch block in FIG. 2, according to an embodiment of the present invention.

The present invention reduces the IR voltage drops in the processor 150 during such a normal operating mode. The integrated circuit 100 includes the switch block 200 that is controlled by the power supply control unit 110. Referring to FIG. 3, the switch block 200 includes a plurality of PMOSFETs (P-channel metal oxide semiconductor field effect transistors) PM1, PM2, . . . , and PMm.

Each of the PMOSFETs PM1, PM2, . . . , and PMm has a respective drain and source coupled between the first and second power lines PWR1 and PWR2. The gates of the PMOSFETs PM1, PM2, . . . , and PMm have an enable control signal En applied thereon. The enable control signal En is generated by the power supply control unit 110.

When the integrated circuit 100 operates in a predetermined operating mode (such as the normal operating mode for example) the first and second operating voltages V1 and V2 applied on the first and second power lines PWR1 and PWR2 are set to a same voltage level. Also in that case, the enable control signal En is activated by the power supply control unit 110 to turn on each of the PMOSFETs PM1, PM2, . . . , and PMm of the switch block 200. The PMOSFETs PM1, PM2, . . . , and PMm that are turned on connect the first power line PWR1 of the first power domain 130 to the second power line PWR2 of the second power domain 150, during the normal operating mode of the integrated circuit 100.

The enable control signal En is deactivated by the power supply control unit 110 to turn off each of the PMOSFETs PM1, PM2, . . . , and PMm when the integrated circuit is not operating in the normal operating mode. In that case such as during the power save mode, the first power line PWR1 of the first power domain 130 remains disconnected from the second power line PWR2 of the second power domain 150 when the voltages applied on the power lines PWR1 and PWR2 are set to different voltage levels.

In one embodiment of the present invention, when the PMOSFETs PM1, PM2, . . . , and PMm are turned on during the normal operating mode of the integrated circuit 100, each of the PMOSFETs PM1, PM2, . . . , and PMm forms a respective current path for diverting respective current to the processor 150 from the memory unit 130. For example such current diverted to the processor 150 from the memory unit 130 may be originated in the power supply control unit 110.

Such an increase of current to the processor 150 may decrease resistances in the processor 150 for reducing IR voltage drops in the processor 150 during the normal operating mode. The reduced IR voltage drops improve the operating frequency of the integrated circuit 100. In addition, the increased current itself to the processor 150 also enhances the operating frequency of the processor 150 during the normal operating mode.

For example, the integrated circuit 100 is restored to the normal operating mode from the power save mode during a reset or a power-up. In that case, the power supply control unit 110 sets the first and second operating voltages V1 and V2 to a same voltage level such as about 1.0 V. Another words, when the integrated circuit 100 is restored to the normal operating mode from the power save mode, the power supply control unit 110 raises the second operating voltage V2 applied on the second power line PWR2 from about 0.7 V to about 1.0 V which is same as the first operating voltage V1. Simultaneously, the power supply control unit 110 activates the enable control signal En for turning on the PMOSFETs PM1, PM2, . . . , and PMm for connecting the first and second power meshes PWR1 and PWR2 of the memory device 130 and the processor 150.

Figure 4:
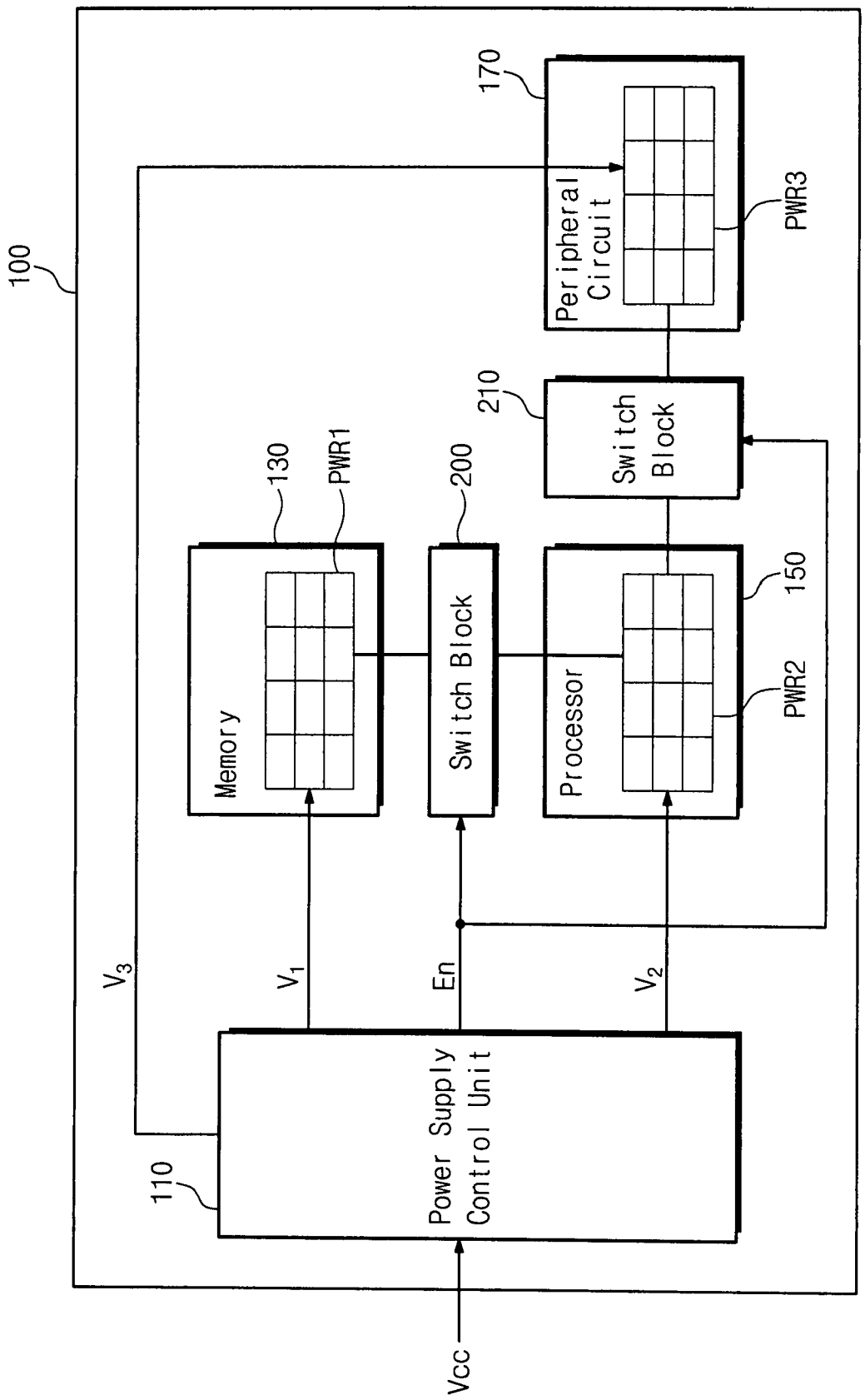
FIG. 4 is a block diagram of a semiconductor integrated circuit with multiple power domains, according to another embodiment of the present invention.

FIG. 4 is a block diagram of a semiconductor integrated circuit 200 according to another embodiment of the present invention. Elements having the same reference number in FIGS. 2 and 4 refer to elements having similar structure and/or function. However, the integrated circuit 200 of FIG. 4 further includes a peripheral circuit 170 forming a third power domain and another switch block 210. The third power domain 170 has a third power line PWR3 which may be implemented as a third power mesh PWR3 having a network structure of meshes. The power supply control unit 110 supplies a third operating voltage V3 applied on the third power line PWR3 of the third power domain 170.

The switch block 210 is implemented similarly as illustrated in FIG. 3 with multiple PMOSFETs between the processor 150 and the peripheral circuit 170. Such PMOSFETs in the switch block 210 have gates with the enable control signal En applied thereon by the power supply control unit 110 similar to the switch block 200.

For example, during the normal operating mode of the integrated circuit 200 when the operating voltages V1, V2, and V3 to the power domains 130, 150, and 170, respectively, are set to a same voltage level such as 1.0 V, the PMOSFETs in the switch blocks 200 and 210 are turned on. In that case, the first power line PWR1 is connected to the second power line PWR2 via the switch block 200, and the third power line PWR3 is connected to the second power lien PWR2 via the switch block 210. Thus, current paths are formed between the first and second power domains 130 and 150 and between the second and third power domains 150 and 170, during the normal operating mode of the integrated circuit 200.

In contrast during the power save or power down operating mode of the integrated circuit 200, the operating voltages V1, V2, and V3 to the power domains 130, 150, and 170, respectively, are set to different voltage levels since the processor 150 does not need to operate at maximum operating frequency. In that case, the PMOSFETs in the switch blocks 200 and 210 are turned off such that the power lines PWR1, PWR2, and PWR3 of the power domains 130, 150, and 170, respectively, remain disconnected from each other. For example, during the power save or power down operating mode of the integrated circuit 200, the third operating voltage V3 to the peripheral circuit 170 is set to a higher voltage than the second operating voltage V2 or may be turned off.

A variety of functions may be implemented by the peripheral circuit 170 depending on features of the integrated circuit 200. For example, when the processor 150 is a digital signal processor (DSP), the peripheral circuit 170 may include an analog-to-digital converter (ADC). In that case, the internal operating voltages V2 and V3 supplied to the DSP 150 and the ADC 170 should be set to the same voltage level during the normal operating mode. Alternatively, the present invention may also be practiced with the memory unit 130 being a flash memory device and with a dynamic random access memory (DRAM) being used instead of the peripheral circuit 170.

In this manner, by selectively controlling connection between power lines PWR1, PWR2, and PWR3 of multiple power domains 130, 150, and 170 according to the operating mode of the integrated circuit 200, power consumption may be minimized during one operating mode while operating frequency is enhanced during another operating mode.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

For example, any type and number of elements illustrated and described herein is by way of example only. The present invention is limited only as defined in the following claims and equivalents thereof.

What is claimed is:

1. An integrated circuit comprising:
   a first power domain;
   a second power domain;

a power supply control unit for supplying a first voltage to the first power domain and a second voltage to the second power domain;

a switch block that provides at least one current path between the first and second power domains during a predetermined operating mode;

a first power line having the first voltage applied thereon within the first power domain, with the first power line being located within the first power domain; and a second power line having the second voltage applied thereon within the second power domain, with the second power line being located within the second power domain;

wherein the switch block connects the first power line to the second power line during the predetermined operating mode, and wherein the switch block disconnects the first power line from the second power line when the integrated circuit is not in the predetermined operating mode, and wherein the first power line has the first voltage applied thereon and the second power line has the second voltage applied thereon while the first and second power lines are disconnected from each-other during the integrated circuit not being in the predetermined operating mode.

2. The integrated circuit of claim 1, wherein the switch block diverts current to the second power domain from the first power domain for increasing the total current in the second power domain during the predetermined operating mode.

3. The integrated circuit of claim 1, wherein the first and second voltages are set to a same voltage level during the predetermined operating mode.

4. The integrated circuit of claim 1, wherein the first and second voltages are set to different voltage levels when the integrated circuit is not in the predetermined operating mode.

5. The integrated circuit of claim 1, wherein the switch block includes a plurality of transistors, with each transistor being turned on for providing a respective current path between the first and second domains during the predetermined operating mode.

6. The integrated circuit of claim 1, further comprising:

a third power domain, wherein the power supply control unit supplies a third voltage to the third power domain; and another switch block that provides at least one current path between the third and second power domains during the predetermined operating mode.

7. The integrated circuit of claim 6, wherein the first, second, and third voltages are set to a same voltage level during the predetermined operating mode.

8. An integrated circuit comprising:

a first power domain having a first power line;

a second power domain having a second power line;

a power supply control unit for supplying a first voltage applied on the first power line, and for supplying a second voltage applied on the second power line; and a switch block that connects the first power line to the second power line during a predetermined operating mode, and wherein switch block disconnects the first power line from the second power line when the integrated circuit is not in the predetermined operating mode;

wherein the first power line is formed as a first power mesh that is located within the first power domain, and wherein the second power line is formed as a second power mesh that is located within the second power domain, and wherein the first power line has the first voltage applied thereon and the second power line has the second voltage applied thereon while the first and second power lines are disconnected from each-other during the integrated circuit not being in the predetermined operating mode.

9. The integrate circuit of claim 8, wherein the switch block includes a plurality of transistors that are turned on for connecting the first power line to the second power line during the predetermined operating mode.

10. The integrated circuit of claim 8, wherein the first and second voltages are set to a same voltage level during the predetermined operating mode.

11. The integrated circuit of claim 8, wherein the first and second voltages are set to different voltage levels when the integrated circuit is not in the predetermined operating mode.

12. The integrated circuit of claim 8, further comprising:

a third power domain having a third power line, wherein the power supply control unit supplies a third voltage applied on the third power line; and another switch block that connects the third power line to the second power line during the predetermined operating mode.

13. The integrated circuit of claim 12, wherein the first, second, and third voltages are set to a same voltage level during the predetermined operating mode.

14. The integrated circuit of claim 12, wherein the switch blocks disconnect the first, second, and third power lines from each-other when the integrated circuit is not in the predetermined operating mode.

15. The integrated circuit of claim 14, wherein the first, second, and third voltages are set to different voltage levels when the integrated circuit is not in the predetermined operating mode.

* * * * *